March 12, 1974     V. PRETORIUS ET AL     3,796,657
APPARATUS FOR DISTRIBUTION SEPARATION PROCESSES, THEIR MANUFACTURE AND USE
Original Filed Dec. 1, 1966                 2 Sheets-Sheet 1

INVENTOR.
VICTOR PRETORIUS
BY HANS HELMUT HAHN

INVENTORS
VICTOR PRETORIUS
BY HANS HELMUT HAHN

United States Patent Office 3,796,657
Patented Mar. 12, 1974

3,796,657
APPARATUS FOR DISTRIBUTION SEPARATION PROCESSES, THEIR MANUFACTURE AND USE
Victor Pretorius and Hans Helmut Hahn, both of 38 Marais St., Bailey's Muckleneuk, Pretoria, Transvaal, Republic of South Africa
Continuation of abandoned application Ser. No. 598,365, Dec. 1, 1966, which is a continuation-in-part of application Ser. No. 548,900, May 10, 1966, now Patent No. 3,493,497. This application Nov. 3, 1970, Ser. No. 86,621
Claims priority, application Republic of South Africa, May 11, 1965, 65/2,502; Dc. 8, 1965, 65/6,633
Int. Cl. B01d 15/08, 53/14
U.S. Cl. 210—31 C   32 Claims

ABSTRACT OF THE DISCLOSURE

The invention relates to distribution separation processes such as chromatography and distillation of the type in which a fluid phase flows relative to a second phase in intimate contact and the separation takes place by material distribution between the phases. Contact between the phases takes place on the surfaces of pores of the porous medium having the structure of an open-pore foam produced by foaming in the ordinary sense or by casting around packed spheres which are subsequently removed. The one phase which is a gas or liquid phase, flows through the interleading pores whilst the other which is a liquid or solid phase is confined to the surface of the pores. Improved results are attained if the gas or liquid phase flows under turbulent conditions, these being enchanced by the foam structure. Wall effects are substantially eliminated, permitting a departure from conventional circular column cross-sections. A statistically uniform pore structure across the entire column cross-section is aimed at.

This application is a continuation of application Ser. No. 598,365, filed Dec. 1, 1966, now abandoned, which in turn is a continuation-in-part of application Ser. No. 548,900, filed May 10, 1966, now Pat. No. 3,493,497, issued Feb. 3, 1970.

The present invention relates to apparatus for distribution separation processes, their manufacture and use, more particularly for distribution processes in which a packing serves as one of the phases between which distribution takes place or in which the packing provides support or carrier surface for one of the phases.

According to one particular aspect the present invention relates to chromatographic apparatus, e.g. columns. In conventional chromatographic columns the separating efficiency is impaired by inhomogeneities resulting from uneven degrees of packing and variations in particle size, the latter having been almost unavoidable to date for reasons of economics, the former being very difficult to avoid completely for technical reasons and both factors being in part interrelated. Imperfections along the column walls resulting in channels differing from those in the packing interior are a most serious problem virtually unavoidable even with the best compacted powder packings. Similar problems also arise in packed distillation or packed adsorption columns. A main consequence of such imperfections is a pronounced, frequently irregular velocity profile (fingering) transverse to the direction of net flow in turn leading to increased plate heights.

The effect of velocity profiles may be counteracted in chromatography by mixing of the forwarding (mobile) phase transverse to the direction of net flow (radial mixing in the case of ordinary columns). The comparative compactness of most conventional packing hampers such mixing both directly as well as indirectly by making more difficult the attainment of high flow velocities. In granular packings the porosity can be increased by looser packing which, however, results in undesirable mechanical instability.

It is an object of the invention to overcome or mitigate the aforesaid disadvantages.

Another object is the attainment of comparatively large and/or evenly accessible surface areas in the column combined with a comparatively high permeability and relatively low pressure drop.

The invention is furthermore intended to make available a very wide choice of different surfaces from which a person skilled in the art may select that type which in respect of inertness or other desired properties best meets his purpose and in such respect may be superior to other conventional columns for the same purpose.

The invention also provides for variability in respect of rigidity or resiliency or flexibility of the column material as may be required or desired for any particular application.

The invention provides for an almost unlimited variability in respect of pore size of the column and the void volume in accordance with certain embodiments may be as high as 97% of the total volume.

Certain embodiments provided for in accordance with the invention are of extraordinarily light bulk weight and low cost, both factors being of considerable importance in the construction of large scale apparatus.

Another advantage attainable where applicable with certain embodiments is the avoidance of preferential liquid accumulations, e.g. of chromatographic retarding phase, in the nips between adjoining packing particles.

It is not essential that all of the above objects or potential advantages be realised simultaneously or to the same degree, since the emphasis may be shifted depending on requirements in each individual case.

The means in accordance with the invention may even serve as a support for the separating medium in dialysis, and the invention is quite generally applicable to separation techniques where it is desired to improve contact between two phases.

In accordance with the invention an appaartus for a distribution separation process is provided comprising a porous packing having three-dimensionally interleading voids for the throughflow of at least one phase bounded by surfaces supporting at least one other phase, said packing furthermore comprising the following features in combination:

(a) that solid portions thereof encompassing a plurality of said interleading voids are mechanically coherent three-dimensionally;

(b) that in any one cross-section taken normal to the direction of net flow through the apparatus the void portions are interrupted by solid portions mechanically fixed relative to one another; and (c) that the porosity characteristics are essentially uniform across the entire packing transverse to the direction of net flow.

In the above definition the said "supporting at least one other phase" is intended to include the special case where the exposed surface of the packing itself serves as such phase. Nor does "supporting" necessarily mean that such other phase is necessarily stationary relative to the packing since such meaning would exclude for example a distillation column in which the liquid phase will necessarily flow downwards over the surface of the packing in countercurrent with the vapors rising through the voids of the packing.

The invention also provides for a distribution separation process of the type in which one fluid phase flows relative to a second phase and a separation takes place by material distribution between the phases, comprising:

(a) maintaining said one phase on the surfaces of the voids of a porous packing confined in an enclosure and having essentially the features as defined further above;
(b) introducing into said enclosure a material to be separated;
(c) passing through the packing and enclosure said fluid phase whilst the material to be separated experiences distribution between the phases; and
(d) withdrawing from said enclosure at least part of the material to be separated with a composition different from its composition prior to its introduction into said enclosure.

Also in accordance with the invention a method of manufacturing an apparatus for a distribution separation substantially as defined above is provided, which comprises:

(I) expanding a material for a packing to form a porous body and fixing it in its expanded condition wherein it comprises the following features in combination:
   (a) that solid portions thereof encompassing a plurality of said interleading voids are mechanically coherent three-dimensionally;
   (b) that in any one cross-section taken normal to the direction of net flow through the apparatus the void portions are interrupted by solid portions mechanically fixed relative to one another; and
   (c) that the porosity characteristics are essentially uniform across the entire packing transverse to the direction of net flow.
(II) confining the expanded and fixed material within an enclosure; and
(III) rendering the surfaces of the voids receptive to participating in a distribution process with a phase movable relative to said surfaces.

From the following more detailed description and explanation of the invention, largely by way of specific examples and in part with reference to the accompanying drawings various additional and/or preferred optional features as well as advantages of the invention will become apparent. Because of the particular advantages pertaining to the application of the invention to chromatography, particular emphasis will be placed on the latter.

Figures 1, 2, 3, 4, 5, 6, 7, 8, 9:
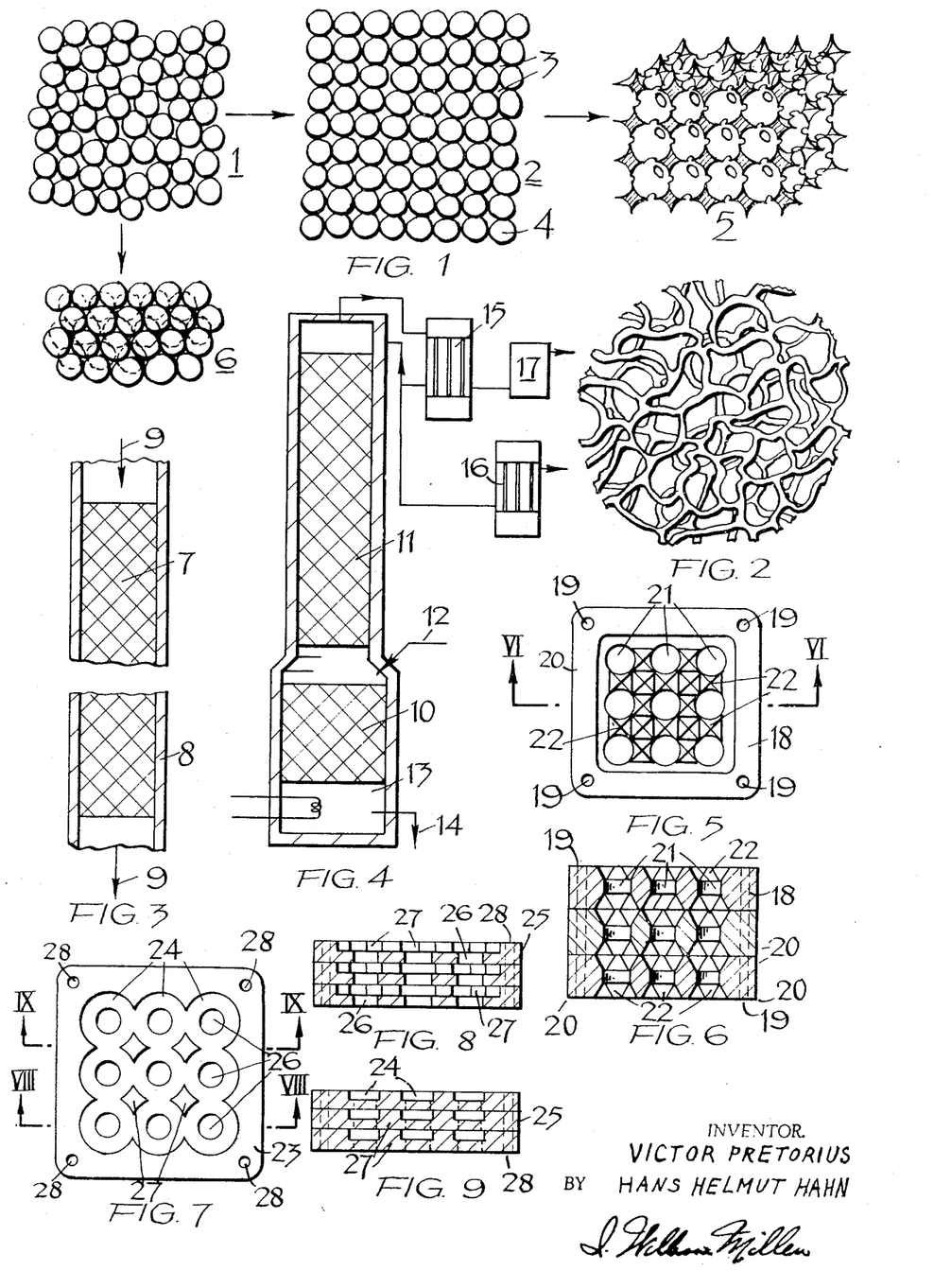
FIG. 1 illustrates diagrammatically different stages in the manufacture of a packing for a separating apparatus in accordance with the invention.
FIG. 2 represents a general view of the structure of yet another form of packing suitable for the invention.
FIGS. 3 and 4 represent diagrammatic sections through some typical examples of apparatus in accordance with the invention.
FIGS. 5 and 7 represent diagrammatic plan views of alternative packings, designed particularly for chromatography.
FIGS. 6, 8 and 9 represent sections along lines VI—VI, VIII—VIII and IX—IX respectively in FIGS. 5 and 7.

Referring now to FIG. 1 a powder consisting of substantially spherical particles is shown randomly packed. An inspection of FIG. 1 shows that the solid parts between the pores are formed by integral structures outlined in all three dimensions thereof by concave shapes of spherical to near-spherical curvature constituting said solid surfaces and facing the pores. This condition normally lacks uniformity and closely approximates a conventional packing in a chromatographic column or in a packed distillation or adsorption column (e.g. glass beads). Provided the particles are solid and disregarding blind pores in packing materials such as kieselguhr, the void volume is at the most 40% of the total bulk volume, when as in the example shown the particles are of uniform size, e.g. obtained by screening. In practice, a considerable particle size range prevails normally, resulting in a considerably reduced void volume percentage.

In practising the present invention a void volume of at least 45% is preferred, disregarding blind pores, and if possible more. Moreover, uniform porosity conditions, i.e. pore size and shape distribution and overall porosity must be assured at least across the entire packing transverse to the direction of net flow and preferably in the direction of net flow as well. Under randomly packed conditions the odds weigh heavily against such uniformity even in the packing interior and even more so in the vicinity of the confining walls.

Perhaps the best practical test for uniformity is actual separating performance, and whilst it may be difficult to lay down rigid limits, it will generally be true that a packing producing no more than 20%, preferably no more than 10% localized variations has very good uniformity by comparison with the prior art.

Therefore according to one embodiment, the material 1 is fluidized in a manner known as such, i.e. by blowing a fluidizing medium e.g. air from underneath in an evenly distributed manner until the powder bed becomes turbulent and assumes the flow properties of a thin boiling porridge. The air flow is then reduced until the turbulence just ceases completely and the particles just rest in contact with one another in the uniform and well-defined metastable condition of loosest packing 2, in which the air flow just balances the tendency of the particles to fully settle to a more densely packed condition. The formation of the required uniform metastable state may be assisted by vibration. In this condition the void volume of the material is 48%, and in this condition the particles are bonded together. For example, the particles consist of or are coated with a sinterable material, e.g. glass or metal beads, wax, thermoplastic resin such as polyhydrocarbons, polyvinylchloride, fluorocarbon resins, polyamides, chlorinated polyethers, silicone resins, polyacrylates or uncured or partly cured reaction-curing resins, e.g. epoxy resin in the B-cure stage, solid at room temperature but still sinterable. Some polymerization processes result in substantially globular particles from the outset. Such powders are then (if necessary) screened to produce a narrow particle size range.

Other materials may be transformed into spherical particles by casting the fused material through a screen (shot tower technique).

Sintering together of the particles to fix them uniformly in the expanded state of the material is achieved according to one embodiment by raising the temperature of the aerating medium as well as the temperature of the vessel in which aeration takes place. The sintered product 2 may be used as such as a packing in a distribution separating apparatus.

However, in accordance with a different embodiment the interstices 3 are now filled up with a reaction curing resin, e.g. an epoxy resin. After curing of this resin the originally particulate material 4 is dissolved or fused or volatilized and removed from the packing, leaving behind a porous body 5 having a void volume of 52%.

Substantially, a similar texture may be attained by expanding the product 2 with internal pressure until the spheres have been stretched and distorted to much the same shape and pattern as that illustrated by 5. Such internal pressure may conceivably be attained by filling the interstices 3 with a material expandable by heat or solvent action and subsequently removable e.g. by volatilization, or solution.

It is also possible to employ beads 1 coated with a bonding agent which after the attainment of condition 2 is rendered tacky by heat or the temporary introduction of a solvent vapor or chemical reagent. In a similar manner solid polymethylmethacrylate particles may be bonded together by temporarily introducing into the air or other fluidizing medium a high proportion of chloroform.

For sintering it is also possible to apply heat dielectrically where the particles are non-conductors (as in the case of the substances just mentioned).

In the case of metallic particles amenable to induction heating, even where the cores only of individual particles comprise such metal, it is possible to employ induction heating for the purpose of sintering.

Some of the techniques for producing porous bodies from particulate materials are already known in different context and can be readily adapted for the purposes of the present invention with or without modifications such as those mentioned in the aforegoing. For example sintered metal beads (bronze) are employed in the manufacture of filters, e.g. oil filters for motor vehicles. The manufacture of porous glass bodies by sintering is also a well established art and so is the sintering of plastic powders into porous bodies, e.g. battery spacers.

Where powders, e.g. certain plastic powders have a well defined melting temperature instead of passing through a plastic range, complications arising therefrom may in some cases be overcome by suitable compounding, e.g. the incorporation of fillers, in a manner well known in the art of plastics manufacture and processing.

Provided friction between the particles is extremely low and the particles are highly uniform and spherical another well-defined completely uniform condition 6, namely that of closest packing is attainable. This material when bonded together would conform with the broadest concept of the packing for an apparatus in accordance with the invention but is not preferred because of the low void volume of only 26%. On the other hand if an aggregate of the particles in that condition is prepared in a matrix which is then solidified, the removal of the particles from the voids leaves behind a void volume of 74% very favorable for the purposes of the invention.

If the same technique is applied to an aggregate having the particles arranged at random in accordance with 1, the void volume of the matrix after removal of the particles will be approximately 60%. If the original particles have been chosen in a reasonably narrow size range and have been reasonably evenly packed, the eventual porous coherent matrix may satisfy the practical requirements of uniform porosity for the purposes of the invention, even though the randomly packed powder itself did not. This is so because in the porous matrix the pore shapes and dimensions are positively controlled by the corresponding shapes and sizes of the particles subsequently removed.

In the various embodiments of this type, the matrix may be organic or inorganic. It may be employed in the form of a liquid or semi-liquid substance which subsequently hardens by chemical reaction, e.g. a reaction curing resin such as polyester or epoxy resin or an inorganic cement such as Sorrel cement, or for some purposes even portland cement or plaster of Paris. It could conceivably be a colloidal system such as a clay slurry which subsequently harden by loss of water and which may, when so required, even be fired eventually with or without glazing.

Other matrix materials, e.g. fusible resins, waxes, low-melting metals or glasses may be employed in a molten condition and caused to solidify by cooling.

The particulate material for the aggregate must be chosen depending on the matrix so that the subsequent removal of the particles does not remove or damage the matrix as well, as will be readily understood. Suitable substances to be removed by melting are beads of waxes, resins or metals melting lower than the matrix. Beads of metal may also be leached out with acids. Beads of waxes, bituminous or other organic substances may be dissolved out with the appropriate organic solvents. Beads of sulphur can be melted out or dissolved in carbon disulphide, pellets or beads of various salts, gelatine, starch or the like may be leached out with water. Most organic and some inorganic substances can also be removed with heat to cause their volatilization, in some cases with decomposition.

The term "packing" as used in this specification is to be understood rather in the colloquial sense in which the term is generally used in the art, i.e. a material constituting the solid filling of a column or like apparatus interspersed by voids or pores. The term does not in any way imply that the material has been forcibly packed or rammed into the apparatus.

The term "pores" in this context is not to be given a narrow interpretation but is rather to be understood as a relative term with reference to the cross-section of a column or like apparatus.

The voids may take the form of pores of a variety of shapes and proportions. According to one extreme and preferred embodiment for many purposes the voids or pores are by far the predominating feature of the column. the solid part constituting but a skeletal structure occupying as little as 3%, say between 2 and 5% of the entire column volume. Thus according to a particularly advantageous embodiment the column packing is essentially a foam with an open pore structure.

Such foam may be produced from any material suitable to form a packing and capable of being transformed into a foam, be it organic or inorganic. Examples of foamable inorganic materials are glass, slag, calcareous binders, including portland and related cement compositions, plaster of Paris.

Examples of suitable organic compositions are in particular to be found in great variety amongst various classes of synthetic resins. The ideal foam structure is shown in FIG. 2, which may be attained with various commercially available foam plastics. The texture is for example known in various flexible polyurethane foams, particularly of the polyether type. By techniques known as such the pore dimensions may be varied within wide limits. Silicone and other open-pore foams have more or less the same structure. The method of producing the foam structure will depend on the nature of the foamable material.

A foamable material may for example be foamed by being whipped up with gas or air to form an open pore foam from the very outset which is then caused to solidify, e.g. by chemical reaction, in particular polymerization or polycondensation, or by cooling (freezing).

An aqueous foam may for example be produced with the aid of suitable foaming agents (surfactants), e.g. sodium alkyl aryl sulphonates, sodium lauryl sulphonate and the like, and caused to solidify by the gelling in said aqueous system of a synthetic resin. The resin may for example be ureaformaldehyde resin, the gelling of which may be brought about with the aid of an acid catalyst, preferably phosphoric or oxalic acid. Urea formaldehyde foams and processes for their production are known as such and require no further discussion. The rigidity of urea-formaldehyde foams may be improved if desired by various additives. In somewhat similar manner known per se it is possible to produce melamine formaldehyde and phenol or resorcinol formaldehyde foams. The above foams may be produced with a very even pore distribution.

In some cases plastic or other foams (both open pore and closed pore) may be produced by the release of gas as a result of chemical reaction of the ingredients of the foam forming material. Typical examples of suitable foams thus producible are rigid and resilient polyurethanes, both of the ether and the ester type.

Polyurethanes which from the outset have the desired open pore structure may for example be produced by the reaction of diisocyanates and a polyol in the presence of a blowing agent, e.g. $CO_2$ liberated by the reaction of an excess of diisocyanate with water, preferably in the presence of a surfactant, e.g. a silicone surfactant and a catalyst, e.g. tin catalyst.

Another foam having a suitable open pore structure is polyvinylchloride foam produced by chemical blowing, in particular by the low density vinyl extrusion process.

So-called reaction type phenolic foam can also be produced with a suitable open cell structure.

Particularly suitable for many purposes because of their chemical and thermal stability are foamed silicones, e.g. silicone rubber foams, which similarly to some other aforementioned foams can be produced quite successfully by in situ foaming.

In some cases, however, the foam texture is initially less perfect than that shown in FIG. 2, in particular by the presence of some lamellae between the skeletal struts of the foam. In some cases it may be possible to remove the lamellae by mechanical bursting, but the preferred method of removal is by chemical leaching or solvent action. This procedure may also be applied to certain foamed slags or foamed glasses, in particular soft glasses, e.g. lead glass, where hot strong alkali, e.g. 10 N KOH at 95° C., say for 50 hours is found effective. Thermal treatment may be resorted to in some cases. In the case of polyurethane foams ester type solvents may be employed. Suitable solvents for polyvinylchloride and epoxy resins are of the ketone type, e.g. methyl-ethyl ketone.

Considerable variation, depending on the intended use of the apparatus is possible with regard also to average pore size. In FIG. 3, for example, the packing 7 indicated diagrammatically by cross-hatching and which could be any of the aforegoing is enolosed in a tube 8 to form an adsorption column or a chromatographic column, the movement of the mobile phase, either gas or liquid, being indicated by arrows 9. Because of the characteristics of the packing there is no change in average column density right to the interface between the walls 8 and the packing 7. To reduce any wall effect even further the packing material is preferably connected with, e.g. integral with or bonded to the walls of the column. Alternatively there is such a close fit that no or very little non-uniformity or discontinuity arises at the interface between column wall and packing. For example where the packing is resilient, a close fit may be realized comparatively easily.

The packing may be bonded to be column walls with an adhesive inert to the substances employed in the separation, e.g. an epoxy resin or polyvinyl acetate adhesive.

Polyurethane foam precut to a cylindrical shape was successfully bonded to the inside of polymethylmethacrylate tubing by introducing the loosely fitting foam into the tubing and then just moistening the foam with chloroform. This caused the foam to swell against the inside of the tube and simultaneously to bond the foam to the tube by the solvent action of the chloroform on the tube material.

Such plastic foams as polyurethane may be cut into the required shape with hot wire.

The porous packing material may be cut up into strips and sandwiched between two sheet materials with impervious strips separating adjoining porous strips from one another and the extremities of the strips being joined to one another through pipe bends of comparatively small diameter to form a column having a total effective length equal to the sum total of the individual strip lengths, e.g. suitable for gas or liquid chromatography.

Many materials may also be foamed or sintered in situ inside the column walls when bonding of the packing to the walls will usually result.

The column walls 8 need not necessarily be rigid. Resilient forms of packing e.g. resilient polyurethane, PVC or silicone rubber may be supplied incorporated in a flexible tube material, e.g. plastic tubing, suitable for forming a column wall, and the user will simply cut off the length of column required for his particular purpose and connect such length to a suitably adapted column inlet (head) and outlet means.

The foam or like packing may, for example, be produced in situ or injected into a preformed plastic or other tube, which for many purposes may be quite thin walled, e.g. of the order of a few hundredths of a millimeter, and for other purposes may be quite strong, say several millimeters thick.

The skin, i.e. the column wall may in some cases also be applied to the pre-formed packing material or the packing material and column wall may be manufactured simultaneously, e.g. by simultaneous concentrical extrusion.

Suitable skin materials may (depending on the purpose of the column) be e.g. polyethylene, polyvinylchloride, polyamides, polyacetals, polyurethane and various natural or synthetic elastomers. In other cases the skin may consist of and be integral with the foam material.

Tubing of thermally shrinking plastics may be applied to the outside of preformed packing material and shrunk firmly into contact with the packing by heating. The chromatogram in accordance with FIG. 15 was for example produced with a column thus prepared.

The features of the invention are useful for chromatography on any scale, from microanalytical up to large-scale preparative work.

In accordance with a preferred embodiment the features of the invention are applied to large scale columns, such columns having a diameter of at least 10 cm., preferably at least 30 cm., more particularly to least 1 m. Such column diameters cannot be employed successfully with conventional chromatographic packings without excessive losses of separating efficiencies. In chromatographic columns it is preferred for the average cross-sectional area of the individual pore to be no more than 1%, preferably no more than 0.1%, more particularly less than 0.01% of the column cross-sectional area. According to some embodiments the pores may be of microscopic dimensions regardless of the cross-sectional area of the columns.

On the other hand, particularly in the case of columns of large diameter, e.g. of 30 cm. or more, the pores may have a diameter of up to 1 cm. or more with a consequential reduction in pressure drop through the column when in operation at the expense of some capacity. It is interesting to note that with some packings having the texture in accordance with FIG. 2, plate heights have been measured of less than the average pore diameter.

The exposed surface of the packing material may itself serve as a stationary phase or be surface treated e.g. chemically, to become a stationary phase or serve as a support for a stationary phase material subsequently applied. In the latter case the stationary phase may take the form of a solid coating, e.g. a layer of colloidal carbon, a precipitate of active alumina, or a gelatinous film, more particularly a deposit of silica gel or synthetic resin, e.g. an ion exchange resin. In particular, however, the packing may serve as a support for various liquids known in the art for that purpose, both polar and nonpolar. If necessary the packing may be subjected to treatment, e.g. with monochloro trimethyl silane or dichloro dimethyl silane to reduce the polarity of the packing surface in a manner known per se. The packing is then impregnated with any suitable retarding phase, e.g. in manners well known in the art.

Where the column packing consists e.g. of polyethylene or polyvinylchloride it is possible to sulphonate the exposed surfaces of the pores to impart ion exchange properties to the packing. In other cases the column is first impregnated e.g. with a silane, prior to such sulphonation.

Because of the low pressure drop through some of the packing materials herein described it becomes feasible to carry out chromatographic separations, concentrations or purifications on a large scale inside pipelines, whilst materials are conveyed through such pipelines from one locality to some other remote locality.

The pore structures lend themselves excellently to chromatography carried out at high speed, e.g. up to several orders of magnitude higher than hitherto customary. It is an inherent characteristic of the packings herein described that the velocity profiles in chromatography are remarkably flat and that "fingering" is hardly if ever observable. The just mentioned unusually high operating speeds can be employed to attain increased throughput and/or separating speed. They can be employed in addition to flatten the velocity profile even further and in particular to eliminate any wall effects. By raising the flow velocity above a predetermined velocity (best expressed as a Reynolds number) there will be achieved a fairly sudden improvement of transverse dispersion because of the development of turbulent eddies behind the solid obstructions (plateau regions) of the packing. Where the forwarding phase is a liquid the preferred linear flow rate is at least 0.2, preferably 0.3 cm./sec. Where the forwarding phase is a gas and subject to the nature of the retarding phase permitting such high speeds, the preferred linear flow rate is above 15 cm./sec., preferably above 20 cm./sec., more particularly at least 30 cm./sec.

The extraordinary characteristics of the packings in respect of mechanical coherence and uniform porosity permit radical departures from conventional column design. Thus it becomes possible, when convenient to deviate from the circular column cross-section at present generally employed. In fact, some embodiments of apparatus, e.g. those illustrated in FIGS. 13 and 14 can hardly be referred to as columns.

When the apparatus in accordance with FIG. 3 is employed as an adsorption column, its high permeability is a particular advantage. The packing may be impregnated with a liquid or solid adsorbent or a chelating agent.

In FIG. 4 the application of the invention to an otherwise conventional continuous distillation apparatus is illustrated, but it will be readily understood that the invention may be applied similarly to laboratory size and batch distillation apparatus. The apparatus shown comprises two column sections 10 and 11, each packed with a packing as described above, indicated diagrammatically by cross-hatching, preferably having the foam texture in accordance with FIG. 2. The material to be separated is introduced in vapor form at 12. The high boiling fraction collects in the heated sump 13 from which some material is continuously withdrawn at 14. The low boiling fraction is condensed in condenser 15, part of the condensate being returned to the column head as reflux, the remainder being withdrawn through a cooler 16, light vapors being condensed at 17.

In the case of columns for distillation comparatively coarse textures, i.e. uninterrupted voids of comparatively large cross-section are advantageous to minimize flooding of the column. In the case of large scale distillation plant the voids may have diameters of several centimeters. Again, because of the uniform porosity and the decreased wall effects a column cross-section other than circular may be employed if convenient. For distillation as well it is possible to treat the surfaces of the packing so as to render them more polar or less polar thereby to modify the wetting characteristics.

The various packings herein described may also be coated with any suitable coating material to render the packing more inert to the materials with which it is to come into contact in the distillation or chromatographic or other separating process. For example, some of the foams herein described were successfully coated with waterglass or with a commercial brand of floor sealing composition.

The considerable versatility of the invention is illustrated by the alternative manners of achieving packings of the required characteristics as shown in FIGS. 5 to 12. Referring to FIGS. 5 and 6, a large number of discs 18 are provided, stacked and bolted together by bolts in positions 19. The discs, manufactured by moulding, e.g. injection moulding of plastics or rubber or by pressing a malleable material, e.g. metal may have any desired shape in plan view, the square shape shown being just one of many possibilities. On both faces each disc carries peripheral raised rims 20 which in the assembly combine to form a column wall. The entire area of each disc surrounded by the rims is recessed on both sides of the disc with the exception of raised pyramidal formations 22, a pattern of holes 21 passing right through the recessed portions and the pyramidal formations 22 being present everywhere between the holes and rising to the same level as the rims 20. The result is once again a complete three dimensional regular network of pores and intervening struts. If desired the discs may be sintered or bonded together.

Referring to FIGS. 7 to 9 discs 23 of metal, e.g. copper have been etched from both sides by a photographic etching process, the technique being for example similar to that employed in the manufacture of "printed circuits." From the one side overlapping circular depressions have been etched into the metal, a continuous rim 25 having been left standing. From the other side holes 26 of a diameter smaller than that of the depressions 24 have been etched through to the center of each depression 24. Between the depressions 26 raised portions 27 are left standing. The discs are assembled and bolted together with bolts in positions 28 to form a column similar to that in accordance with FIGS. 5 and 6.

Figure 10:
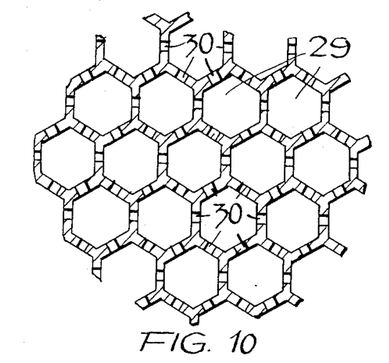
FIG. 10 represents a cross-section through a further embodiment of a packing.

Yet another possibility is shown in FIG. 10. Here a material of honeycomb-like cross-section has been extruded from plastics or metal to result in a bundle of capillaries 29. The walls between adjoining capillaries have been pierced at 30 to achieve complete three dimensional communication. As a further modification the piercing may be in the form of slots which are subsequently stretched open with simultaneous twisting deformation of the capillary walls in a manner known per se from the manufacture of expanded metal.

Figure 11:
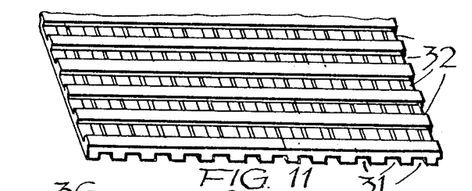
FIG. 11 represents a perspective view of a packing member for being assembled to form a chromatographic column as illustrated in FIG. 12.
Figure 12:
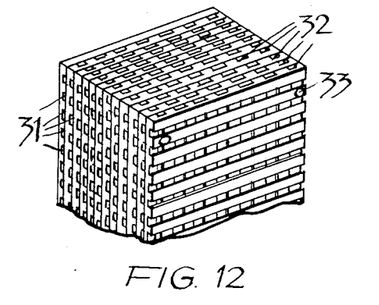

Referring to FIGS. 11 and 12 plastics or metal is extruded to result in a sheet material flat on one side and having narrow parallel grooves 31 on the other side extended in depths just over halfway into the sheet material. Similar parallel grooves 32 are then milled into the opposite side of the sheet material at right angles to grooves 31 and sufficiently deep to just intersect the grooves 31. As shown in FIG. 12 a large number of such sheets are then stacked and bolted together at 33 to again result in a coherent packing material with perfectly uniformly distributed three-dimensionally interleading voids. The percentage void volume and pore size may be adjusted as desired are required by the dimensioning and spacing of the grooves.

With conventionally packed beds chromatographic elution in more than one dimension of the packing is precluded by the lack of uniformity and lack of coherence of the packing. With packings as described it becomes feasible to elute in more than one dimension in succession in a manner analogous to two-dimensional paper chromatography, but with the advantage of greatly increased capacities useful when complicated mixtures are to be separated on a preparative scale, e.g. mixtures of amino acids. An apparatus for that purpose is illustrated diagrammatically in FIG. 13 which shows a box 34 between the top and bottom of which a square slab 35 of packing material in accordance with FIG. 2 is sandwiched, leaving peripheral gaps all around between the sides of the slab 35 and the side walls of the box 34. These gaps are partitioned diagonally by corner partitions 36 to produce two eluent inlet chambers 37 and 38, an outlet chamber 39 opposite chamber 37 and an outlet chamber subdivided into a large number of smaller chambers 40 opposite chamber 38. Each inlet chamber has an inlet nipple and each outlet chamber has an outlet nipple. Near the corner between chambers 37 and 38 a sample inlet 41 is provided closed by a soft synthetic rubber membrane having a selfsealing aperture 42. In use the sample is introduced by injection through aperture 42 with a hypodermic syringe. A first eluent is then passed through the packing from chamber 37 to chamber 39. If desired this elution may be continued until some components of the sample have already been removed with the eluate through chamber 39. But this need not be. At a predetermined stage of the elution when different components of the sample have travelled different distances the eluent introduction at 37 is stopped and elution is now continued with a different eluent from chamber 38 towards chambers 40, the different components now emerging from different chambers 40 and at different times.

Figure 13:
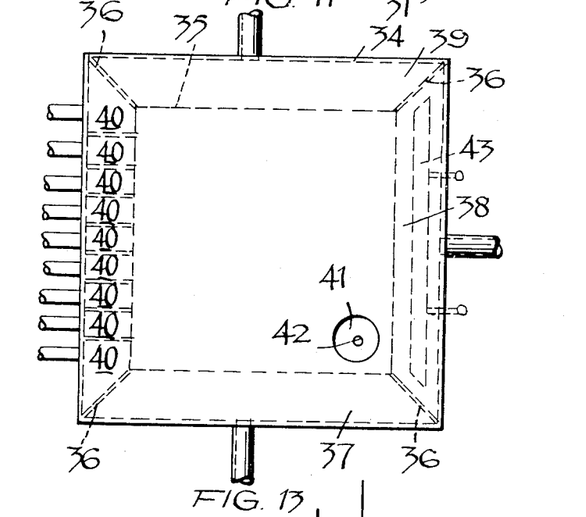
FIG. 13 represents an apparatus in accordance with the invention for eluting chromatographically in two dimensions.

As a further development of this concept provision is made for blanking off those sides of the packing 35 which at any one stage are parallel to the direction of elution, e.g. with a closure member 43, of which only one is shown. This will be necessary only if a tendency exists for the eluent to bypass the packing.

Figures 14, 15:
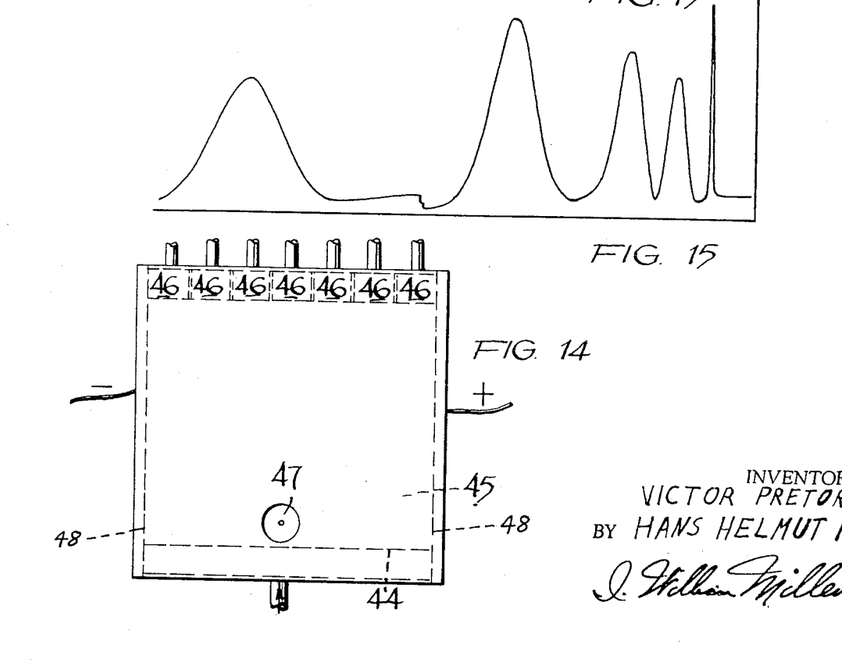
FIG. 14 represents a further embodiment for eluting chromatographically in one dimension and simultaneously displacing substances selectively in another dimension along a potential gradient.
FIG. 15 represents a gas chromatogram obtained by the process in accordance with the invention.

FIG. 14 is based on a similar concept to the above as well as to paper electrophoresis, there being an eluent inlet chamber 44 along one side of the packing 45 and a plurality of outlet chambers 46 arranged side by side opposite chamber 44. The other two sides of the box are closed by two electrodes 48. The apparatus is designed for the separation of amphoteric substances introduced through a sample inlet 47 as in FIG. 13. The separation takes place by elution and simultaneous differential lateral displacement under the influence of the applied potential. By comparison with piles of paper sheets the apparatus offers the advantage of perfect uniformity in all dimensions.

EXAMPLE 1

A polyurethane column is prepared, foam texture as in FIG. 2, void volume 97%, 30 pores per cm., column length 187 cm., diameter 0.25 cm. The foam is coated with silicone oil introduced as a 10% v./v. solution in petroleum ether, the latter being subsequently evaporated off. A sample of a mixture of normal paraffins from $C_4$ to $C_8$ is introduced (2.5 microliters) and eluted with hydrogen at a linear flow velocity of 10 cm./sec. The chromatogram recorded in conventional manner is shown in FIG. 15. As usual it is to be read from right to left, the first peak being due to butane, followed by pentane, hexane, heptane and octane. The pressure drop was only between 1 and 1.5 atm.

EXAMPLE 2

The same column is tested for plate heights at different flow velocities. With liquid eluents full radial dispersion is apparent by the attainment of a minimum plate height of 1 mm. at 0.3 cm./sec.

With a gas as eluent the plate height at 15 cm./sec. is 0.5 mm., and drops to 0.2 mm. at 30 cm./sec. which from the slope of the curve seems to be near the optimum. Another similar packing with 40 holes per cm. produces a plate height of 0.1 mm. at 30 cm./sec.

EXAMPLE 3

Detector probes are inserted in different packings of columns of 5 cm. diameter. In conventional packings fingering is clearly discernable and there is a pronounced wall effect. With a packing having the same characteristics as in the previous example no fingering is observable at all and the wall effect is much less pronounced.

EXAMPLE 4

A silicone rubber foam column is impregnated with medicinal paraffin. The void volume is 85% and there are 20 pores per cm. 70% aqueous acetone is saturated with medicinal paraffin to serve as a mobile phase. A mixture of palmitic and stearic acids is dissolved in a small volume of mobile phase and allowed to seep into the column, whereafter elution proceeds with more 70% aqueous acetone. The column temperature is maintained constant at 30° C. by water jacketing. A complete separation of palmitic from stearic acid is attained at a linear flow rate of 0.3 cm./sec. l=30 cm.

EXAMPLE 5

A column as described with reference to any one of FIGS. 5 to 12 is coated internally with a highly absorbtive layer of carbon black as follows:

The column is filled with a dispersion in a highly volatile liquid of colloidal carbon. Such dispersions are commercially available. The volatile liquid is carefully evaporated off and the coating of colloidal carbon is left behind. The thickness of the carbon coating can be controlled as desired by adjusting the concentration of the dispersion.

The thus prepared column can be used inter alia for the separation of oxygen from nitrogen gas using hydrogen gas or helium gas as a mobile phase. The conditions under which the separation is carried out are known as such from chromatography.

The active carbon layer may also be partly deactivated in a manner known per se by treatment with squalene whereafter the column is suitable for the separation of propane from butane and similar separation problems under conditions in other respects known per se.

EXAMPLE 6

Comparative experiments were carried out on a jacketed distillation column, inner diameter 50 mm., length 90 cm. The following packings were compared:

(a) Podbielniak heligrid;
(b) randomly packed porcelain Raschig rings 6 x 6 mm.;
(c) polyurethane foam as in FIG. 2, void volume 97%, pore size approximately 5 mm.

Plate length measurements were carried out with the testing mixture n-heptane-methylcyclohexane. The following set of measurements was taken:

| Packing | (a) | (b) | (c) |
|---|---|---|---|
| Throughput ml./hr | 4,000 | 5,000 | 5,000 |
| Holdup (ml.) | 160 | 290 | 120 |
| Pressure drop (mm. Hg) | 5 | 23 | 5 |
| Plate height (cm.) | 1.3 | 12 | 1.1 |

In addition the maximum throughput before flooding was determined as follows:

(a) 6000 ml./hr.
(b) 5200 ml./hr.
(c) 6000 ml./hr.

The results show that packing (c) is much superior to packing (b) and even compares favorably with packing (a) which latter is very expensive.

We claim:
1. A chromatographic separation process wherein the material to be separated is introduced into a space having defined outlines occupied by a porous material having pores through which a fluid forewarding phase is caused to flow in intimate contact with a retarding phase exposed on surfaces of the pores, whereby components of the mixture to be separated are distributed between the phases in different distribution ratios and become separated, comprising the improvement that the retarding phase is exposed to the fluid forwarding phase on skeletal surfaces of said porous material, extending essentially coherently and continuously across the entire space essentially uniformly in all directions normal to the average direction of flow and having essentially the texture of an open-pore foam and further comprising an additional separation step in the space performed in a direction perpendicular to the first separation step.

2. Apparatus for carrying out a chromatographic separation process comprising
(a) a hollow chamber defining a flow path for a chromatographic forwarding phase through the apparatus and containing a coherent porous body extending essentially continuously across said chamber and having essentially the texture of an open pore foam, formed by pores serving as passages for the forwarding phase, said texture being essentially uniform across said chamber normal to the flow path, and skeletal surfaces outlining the pores being coated with a solid adsorbent chromatographic retarding phase;
(b) means to introduce a mixture to be separated into the chamber;
(c) means to establish through the chamber along the flow path a flow of the forwarding phase; and
(d) means for withdrawing from the apparatus at least two different separated fractions.

3. Apparatus for carrying out a chromatographic separation process comprising:
(a) a hollow chamber defining a flow path for a chromatographic forwarding phase through the apparatus and containing a coherent porous body of polymeric material extending essentially continuously across said chamber and having essentially the texture of an open pore foam, formed by pores serving as passages for the forwarding phase, said texture being essentially uniform across said chamber normal to the flow path and skeletal surfaces outlining the pores being coated with a sealing layer which in turn carries a chromatographic retarding phase;
(b) means to introduce the mixture to be separated into the chamber;
(c) means to establish through the chamber along the flow path a flow of the forwarding phase; and
(d) means for withdrawing from the apparatus at least two different separated fractions.

4. Chromatographic separation process of the type in which a liquid forwarding phase flows through a space having defined outlines in intimate contact with a retarding phase and components of a mixture to be separated are distributed in different distribution ratios to form at least two different separated fractions, comprising the improvement that the liquid forwarding phase is conducted through interleading pores of a porous material extending essentially coherently and continuously across the entire space essentially uniformly in all directions normal to the average direction of flow of the forwarding phase, the pores of said material forming essentially a texture of an open pore foam and the retarding phase being essentially exposed to said intimate contact on the outside of skeletal surfaces forming outlines of the pores.

5. Process as claimed in claim 4 wherein the material forwarding phase is fed through said pores with a velocity at which turbulent conditions prevail in the forwarding phase.

6. Process as claimed in claim 4 wherein the linear flow velocity of the liquid forwarding phase through the space is at least 0.2 cm. per second.

7. Chromatographic separation process of the type in which a liquid forwarding phase flows through a space having defined outlines in intimate contact with a retarding phase and components of a mixture to be separated are distributed in different distribution ratios to form at least two different separated fractions comprising the improvement that the liquid forwarding phase is conducted through interleading pores of a porous material having essentially the texture of an open pore foam and the retarding phase being essentially exposed to said intimate contact on the outside of skeletal surfaces forming outlines of the pores, the liquid forwarding phase being conducted through pores of the porous material with a flow velocity at which turbulent conditions in the forwarding phase prevail and the linear flow velocity of the forwarding phase through the space being at least 0.2 cm. per second.

8. Apparatus for carrying out a chromatographic separation process involving distribution of components of a mixture to be separated between two phases, comprising:
(a) a hollow chamber defining a flow passage through the apparatus having an inlet end and an outlet end and containing a coherent porous body extending across the entire flow passage having essentially the texture of an open pore foam and the pores of which serve as passages for the flow therethrough of one of the said two phases;
(b) the other of said two phases being a liquid phase present on the skeletal surfaces of the porous body, exposed to the phase referred to under (a); and
(c) a sealing coating whereby the material of the coherent porous body is sealed off from the liquid phase.

9. Distribution separation process of the type in which a fluid phase flows relative to a second phase through a space having defined outlines and a separation takes place by material distribution between the phases, the second phase being exposed on the surfaces of voids of a porous material, a single phase mixture to be separated being introduced to said space and the said fluid phase being caused to flow through the voids of the material in intimate contact with the second phase whilst components of the mixture are distributed between the phases in different distribution ratios to form at least two different separated fractions, comprising the improvement that the said fluid phase is conducted through voids represented by pores of said material being a porous material, said pores being essentially interleading, the material extending essentially as a coherent and continuous body across the entire space, essentially uniformly in all directions normal to the average direction of said conducting of the fluid phase, the pores of the material forming essentially a texture of an open pore foam, and said second phase and said distribution between the phases being confined to essentially only the surface regions of skeletal surfaces inside said pores forming outlines of the pores.

10. A process as claimed in claim 9 wherein the porous material is confined in a passage, forming a body extending coherently, continuously and essentially uniformly across the entire cross-section of the passage, the mixture being introduced into the passage and the fluid phase being conducted through the passage.

11. A process as claimed in claim 9 wherein the second phase forms a distinct layer on the outside of the skeletal surface.

12. Process as claimed in claim 9 wherein at least one of said phases is a liquid, said liquid being restricted to the outside of the skeletal surfaces.

13. Process as claimed in claim 12 wherein the liquid is a stationary phase restricted to the outside of the skeletal surfaces.

14. Process as claimed in claim 12 wherein at least one of said phases is a liquid phase flowing relatively to the porous material.

15. Process as claimed in claim 14 carried out under conditions of distillation and wherein the fluid phase is a vapor phase which is conducted through the interleading pores forming essentially a texture of an open pore foam and on the skeletal surfaces of which is exposed a film of liquid condensate phase representing the second phase, said distribution between the phases being essentially confined to the surface regions of skeletal surfaces forming outlines of the pores inside said pores.

16. Process as claimed in claim 9 wherein the fluid phase is a forwarding phase in a chromatographic separating process and the second phase is a retarding phase.

17. A chromatographic separation process wherein a mixture to be separated is introduced into a space having defined outlines occupied by a porous material having pores through which a fluid forwarding phase is caused to flow in intimate contact with a retarding phase exposed on surfaces of the pores, whereby components of the mixture to be separated are distributed between the phases in different distribution ratios and become separated, comprising the improvement that the retarding phase is exposed to the fluid forwarding phase on the skeletal surfaces of said porous material occupying the inside of a pipeline and having essentially the texture of an open pore foam, the forwarding phase being conducted through interleading pores of the porous material, whilst the mixture is simultaneously conveyed from one locality to a geographically different locality through said pipeline and is withdrawn from the pipeline in a separated condition.

18. Apparatus for carrying out a separation process of the type involving distribution of the components of a mixture to be separated between two phases comprising:
(a) a hollow chamber defining a flow passage through the apparatus and containing a coherent porous body comprising essentially fluid impervious skeletal surfaces adapted as limiting and locating means for one of said phases in intimate contact on the outside of said surfaces with another phase, said skeletal surfaces being essentially incapable of dissolving fluids, and, forming outlines of interleading pores of the body which serve as flow channels for said other phase, said skeletal surfaces and interleading pores forming essentially the texture of an open pore foam, said texture and body extending essentially continuously and uniformly across said entire chamber in all directions normal to said flow passage;
(b) means to introduce the mixture into the chamber;
(c) means to establish through the flow passage a flow of said other phase; and
(d) means for withdrawing from the apparatus at least two different separated fractions.

19. Apparatus according to claim 18, wherein the hollow chamber is a chromatographic column, said porous body having exposed on and restricted to that side of the impervious skeletal surfaces which faces into the pores, a substance representing a chromatographic retarding phase.

20. Apparatus according to claim 19, wherein the impervious skeletal surfaces are coated with liquid retarding phase.

21. Apparatus according to claim 18, wherein the porous body is an open pore foam of which the interleading pores occupy at least 80% of the total volume of the body.

22. Apparatus according to claim 18, wherein the interleading pores occupy in excess of 45% of the total volume and represent the matrix of an aggregate of a particulate material left behind after the selective removal of the particles of the particulate material out of the matrix.

23. Apparatus for carrying out a chromatographic separation process involving distribution of the components of a mixture to be separated between two phases comprising:
(a) a hollow chamber defining a flow passage through the apparatus having an inlet end and an outlet end and containing a coherent porous body having essentially the texture of an open pore foam and the pores of which serve as passages for the flow therethrough of one of the said two phases, said one phase being a chromatographic liquid forwarding phase;
(b) the other of said two phases being present on the skeletal surfaces of the porous body exposed to the phase referred to under (a); and
(c) the said pores being filled with said liquid forwarding phase.

24. Apparatus according to claim 23 comprising a liquid retarding phase forming a film on impervious skeletal surfaces of the porous body, lining the passages for the flow.

25. Chromatographic separating apparatus comprising a continuous, coherent porous body having the texture of an open pore foam comprising interleading pores filled with a liquid forwarding phase and defined by impervious skeletal surfaces carrying on and restricted to, the outside thereof a film of a retarding phase distinct from the material of which the porous body is composed, selected from the group consisting of solid and liquid retarding phases.

26. Apparatus as claimed in claim 25 wherein the body is bonded to a wall.

27. Apparatus as claimed in claim 25 wherein the body is bordered by a plane wall.

28. Apparatus as claimed in claim 27 adapted for elution in at least two directions at right angles to one another parallel to the wall.

29. Chromatographic separating apparatus comprising a continuous, coherent porous body having the texture of an open pore foam comprising interleading pores filled with a liquid forwarding phase, the pores being defined by skeletal surfaces on which is exposed a chromatographic retarding phase, the body having a prismatic configuration and being bordered by a plane impervious wall parallel to a direction of flow of the forwarding phase prescribed by the apparatus, said texture in a direction normal to said wall being essentially uniform and continuous.

30. Process as claimed in claim 16 wherein a chromatographic separation is carried out in a foam pipeline whilst the material to be separated is simultaneously being conveyed from one locality to a geographically different locality through said pipeline, the pipeline defining the outlines of said space, said porous material, the pores of which form essentially the texture of an open-pore foam, being accommodated inside the pipeline, and the chromatographic distribution between said phases being brought about along the surface regions of skeletal surfaces of said porous material inside the pipeline.

31. A chromatographic separation process wherein a mixture to be separated is introduced into a space having defined outlines occupied by a porous material having pores through which a fluid forwarding phase is caused to flow in intimate contact with a retarding phase exposed on surfaces of the pores, whereby components of the mixture to be separated are distributed between the phases in different distribution ratios and become separated, comprising the improvement that the retarding phase is exposed to the fluid forwarding phase on the skeletal surfaces of the porous material, said skeletal surfaces constituting the outlines of interleading pores of the porous material which has essentially the texture of an open-pore foam, the forwarding phase being conducted through said pores with a flow velocity at which flow conditions in the forwarding phase are essentially turbulent, said process being carried out in a pipeline occupied by the porous material whilst components of the mixture are simultaneously conveyed from one locality to a geographically different locality through said pipeline.

32. A chromatographic separating apparatus as defined by claim 25 wherein said film of a retarding phase is a solid.

References Cited

UNITED STATES PATENTS

| | | | |
|---|---|---|---|
| 3,171,820 | 3/1965 | Volz | 261—94 X |
| 3,340,085 | 9/1967 | Halasz et al. | 55—386 X |
| 3,347,020 | 10/1967 | Van Venrooy | 55—386 X |
| 3,357,158 | 12/1967 | Hollis | 55—197 X |
| 3,410,057 | 11/1968 | Lerner | 261—94 X |
| 3,549,524 | 12/1970 | Haller | 210—31 |

OTHER REFERENCES

Baum, Elliot H., "Evaluation of Microporous Polyethylene as a Low Temperature Gas Chromatographic Support," J. of G. C., November 1963, pp. 13–15.

SAMIH N. ZAHARNA, Primary Examiner

T. G. WYSE, Assistant Examiner

U.S. Cl. X.R.

210—198 C; 55—67, 197, 386; 73—23.1; 261—94